United States Patent
Arthur et al.

(10) Patent No.: US 7,993,787 B2
(45) Date of Patent: Aug. 9, 2011

(54) METHOD FOR FAST AND RELIABLE FUEL CELL SYSTEM START-UPS

(75) Inventors: David A. Arthur, Honeoye Falls, NY (US); John P. Salvador, Penfield, NY (US); Seth E Lerner, Honeoye Falls, NY (US); Balasubramanian Lakshmanan, Pittsford, NY (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 770 days.

(21) Appl. No.: 11/859,300

(22) Filed: Sep. 21, 2007

(65) Prior Publication Data

US 2009/0081491 A1 Mar. 26, 2009

(51) Int. Cl.
*H01M 8/04* (2006.01)
(52) U.S. Cl. ......... 429/429; 429/430; 429/432; 429/444
(58) Field of Classification Search .................... 429/13, 429/21, 22, 23, 25
See application file for complete search history.

(56) References Cited

U.S. PATENT DOCUMENTS

| 7,011,902 B2 | 3/2006 | Pearson | |
|---|---|---|---|
| 2002/0014802 A1* | 2/2002 | Cratty | 307/43 |
| 2002/0122963 A1* | 9/2002 | Buchner et al. | 429/13 |

* cited by examiner

*Primary Examiner* — Raymond Alejandro
(74) *Attorney, Agent, or Firm* — John A. Miller; Miller IP Group, PLC

(57) ABSTRACT

A method for providing a fast and reliable start-up of a fuel cell system. The method uses a stack voltage response to a load to assess if hydrogen and oxygen are being sufficiently distributed to all of the fuel cells by coupling an auxiliary load to the fuel cell stack until a predetermined minimum cell voltage has been reached or a first predetermined time period has elapsed. The method then determines whether a minimum cell voltage has dropped to a first predetermined voltage and, if so, reduces the maximum power allowed to be below the first predetermined voltage value, determines whether the minimum cell voltage in the stack is below a second predetermined voltage, or determines whether the minimum cell voltage drop rate is greater than a predetermined voltage drop rate. If none of these conditions are met, the method returns to loading the stack with system components.

22 Claims, 3 Drawing Sheets

METHOD FOR FAST AND RELIABLE FUEL CELL SYSTEM START-UPS

BACKGROUND OF THE INVENTION

1. Field of the Invention

This invention relates generally to a method for providing fast and reliable fuel cell system start-ups and, more particularly, to a method for providing fast and reliable fuel cell system start-ups that includes coupling an auxiliary load to the fuel cell stack at start-up until a predetermined minimum cell voltage has been reached by a fuel cell in the stack or a predetermined period of time has elapsed.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It has been proposed in the art to provide stack order switching or anode flow-shifting in a fuel cell system that employs split stacks. Particularly, valves and plumbing in the system are provided so that the anode exhaust gas exiting a first sub-stack is sent to the anode side of a second sub-stack, and the anode exhaust gas exiting the second sub-stack is sent to the anode side of the first sub-stack in a cyclical manner.

When a fuel cell system is shut down, un-reacted hydrogen gas remains in the anode side of the fuel cell stack. This hydrogen gas is able to diffuse through or cross over the membrane and react with the oxygen in the cathode side. As the hydrogen gas diffuses to the cathode side, the total pressure on the anode side of the stack is reduced below ambient pressure. This pressure differential draws air from ambient into the anode side of the stack. When the air enters the anode side of the stack it generates a hydrogen/air front that creates a short circuit in the anode side, resulting in a lateral flow of hydrogen ions from the hydrogen flooded portion of the anode side to the air-flooded portion of the anode side. This high ion current combined with the high lateral ionic resistance of the membrane produces a significant lateral potential drop (~0.5 V) across the membrane. This produces a local high potential between the cathode side opposite the air-filled portion of the anode side and adjacent to the electrolyte that drives rapid carbon corrosion, and causes the carbon layer to get thinner. This decreases the support for the catalyst particles, which decreases the performance of the fuel cell.

At the next system start-up, assuming enough time has gone by, both the cathode and anode flow channels are generally filled with air. When hydrogen is introduced into the anode flow channels at system start-up, the hydrogen pushes out the air in the anode flow channels also creating a hydrogen/air front that travels through the anode flow channels. The hydrogen/air front causes a catalytic reaction along the length of the membrane in each fuel cell as the front moves that, in combination with the reaction across the membrane, creates a high electric voltage potential. This combined electric voltage potential is high enough to severely degrade the catalyst and the carbon particles on which the catalyst is formed, reducing the life of the MEAs in the fuel cell stack. Particularly, the reaction created by the hydrogen/air front in combination with the normal fuel cell reaction is orders of magnitude greater than only the fuel cell reaction across the membrane. For example, it has been shown that without addressing the degradation effects of the hydrogen-air front at system start-up, it only takes about 100 shutdown and start-up cycles to destroy the fuel cell stack in this manner.

It has been proposed in the art to reduce the degradation effect of the hydrogen/air front at system start-up by forcing hydrogen through the anode flow channels as quickly as possible so as to reduce the time that the degradation occurs. It has also been suggested to introduce hydrogen into the anode flow channels at a slow rate to provide active mixing of the air and hydrogen to eliminate the hydrogen/air front. It has also been proposed in the art to cool the fuel cell before removing the hydrogen from the anode flow channels. However, all of these solutions have not reduced the hydrogen/air degradation enough to provide a desired lifetime of the fuel cell stack. Particularly, moving the hydrogen/air front quickly does not completely eliminate the degradation of the catalyst, and requires over-sized piping and other components to rapidly purge the air from the anode flow channels. Introducing the hydrogen slowly at start-up has the disadvantage of requiring a recirculation pump that takes several minutes to completely remove the air from the anode flow channels. Further, requiring precise control of the amount of hydrogen into the anode flow channels is difficult to implement.

It has also been proposed in the art to provide a load across the fuel cell stack, such as a resistor, to reduce the electric potential generated by the hydrogen/air front. However, an extremely low resistance load will require electrical components with a high power rating. Also, flow and balancing between cells in a fuel cell stack can result in corrosion to the cell anodes. Furthermore, in most embodiments, a resistor is typically not sufficient on its own to minimize carbon corrosion.

The ideal fuel cell system start-up method purely from a speed and reliability perspective would be to flow hydrogen at a very high flow rate through the split stacks in parallel and then out of the anode exhaust. Reliability is a function of cell voltage, and those cells at system start-up that included significant air in the anode flow channels could cause a very low, possibly negative, cell voltage. The flow rate would be high enough that any water blocking the anode flow fields will be forced out of the stack. Also, any start-up degradation from the hydrogen/air front would be low because the front speed would be so fast. However, a problem exists in that the anode exhaust may have a relatively high concentration of hydrogen, possibly causing a combustible mixture. Such high anode flow rates would therefore require additional system components, such as combustors, accumulators, etc., resulting in a complex system.

It has been proposed in the art to fill the anode manifold with hydrogen at system start-up, and then evenly flow hydrogen gas through the anode flow channels. However, it has been shown that this type of purge does not alone provide even hydrogen flow through the cells, so additional actions may be needed. This is a result of air still existing in the hydrogen flow channels, especially at cold start.

SUMMARY OF THE INVENTION

In accordance with the teachings of the present invention, a method for providing a fast and reliable start-up of a fuel cell system is disclosed. The method includes starting a compressor that provides cathode air to the cathode side of a fuel cell stack to provide dilution air for the hydrogen exhaust. The method then determines if the stack is filled with air and, if so, performs a stack flush with hydrogen gas. The method then begins a hydrogen flow to the anode side of the stack and a cathode airflow to the cathode side of the stack. The method then uses a stack voltage response to a load to assess if hydrogen and oxygen are being sufficiently distributed to all of the fuel cells by coupling an auxiliary load to the fuel cell stack until a predetermined minimum cell voltage has been reached or a first predetermined time period has elapsed. The method then couples the stack to system components to load the stack to a predetermined maximum level for a predetermined period of time. The method then determines whether a minimum cell voltage in the stack has dropped to a first predetermined voltage and, if not, determines whether the stack has reached a maximum allowed power. If the minimum cell voltage has reached the first predetermined voltage value, then the method reduces the maximum power allowed to be below the first predetermined voltage value, determines whether the minimum cell voltage in the stack is below a second predetermined voltage, or determines whether the minimum cell voltage drop rate is greater than a predetermined voltage drop rate. If none of these conditions are met, the method returns to loading the stack with system components.

Additional features of the present invention will become apparent from the following description and appended claims taken in conjunction with the accompanying drawings.

DETAILED DESCRIPTION OF THE EMBODIMENTS

The following discussion of the embodiments of the invention directed to a method for reliably and quickly starting a fuel cell system is merely exemplary in nature, and is in no way intended to limit the invention or its applications or uses.

Figure 1:
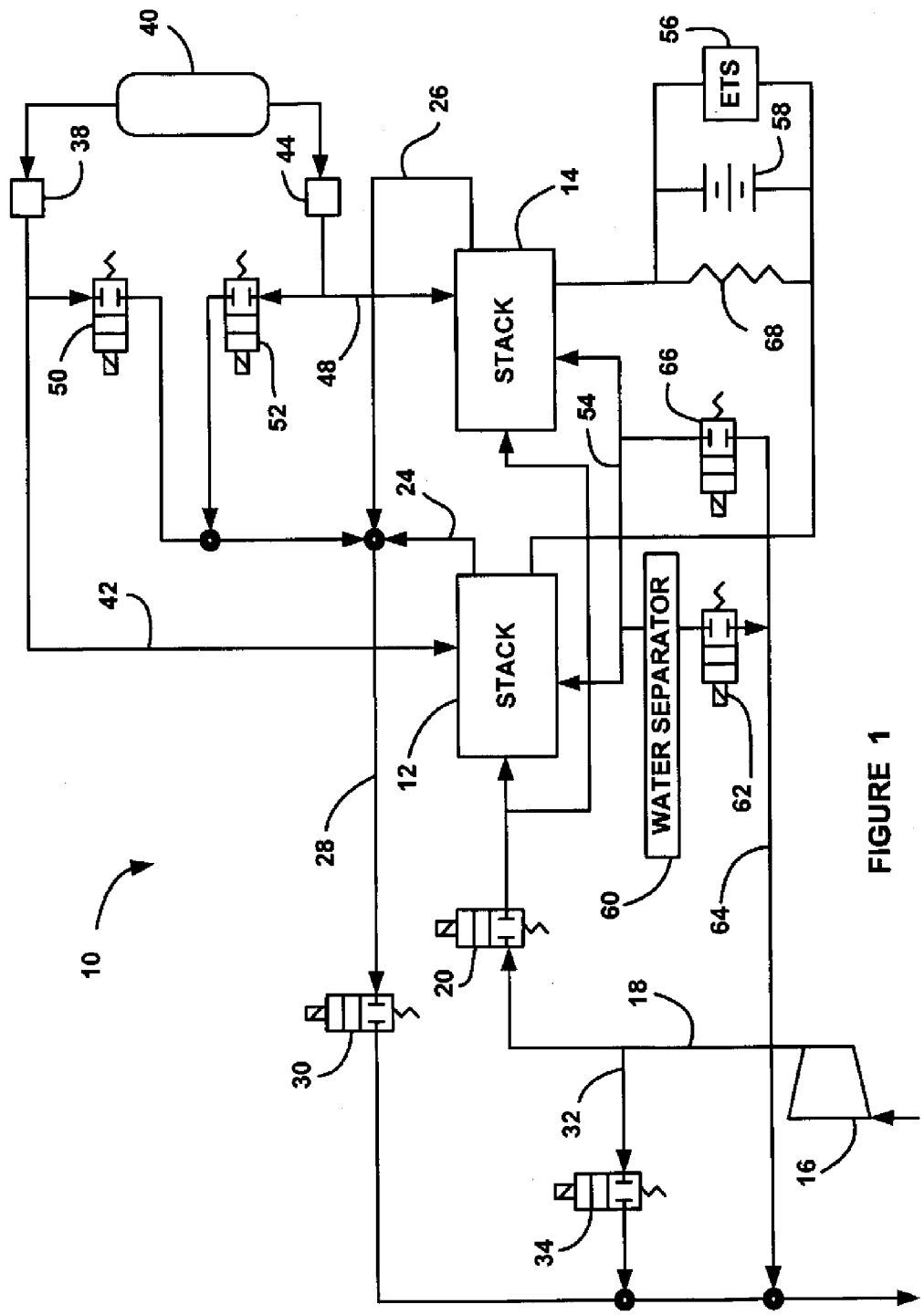
FIG. 1 is a schematic block diagram of a fuel cell system employing anode flow-shifting.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. Cathode exhaust gas is output from the split stack 12 on line 24 and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, then air from the compressor 16 will by-pass the stacks 12 and 14. Typically, a cathode humidification unit (not shown) will be provided at a suitable location in the cathode input line 18.

In this non-limiting embodiment, the split stacks 12 and 14 employ anode flow-shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from the hydrogen source 40 through anode line 48 to the split stack 14 in an alternating sequence. A connector line 54 connects the anode sides of the split stacks 12 and 14.

A water separator 60 is coupled to the connector line 54 and collects water in the anode gas flow between the split stacks 12 and 14. A normally closed drain valve 62 can be employed that is periodically opened to vent the water to the cathode exhaust gas line 28 on line 64. Further, an anode exhaust gas purge valve 66 can be provided in the connection line 54.

As discussed above, it is desirable to periodically bleed the anode side of the split stacks 12 and 14 to remove nitrogen that may otherwise dilute the hydrogen and affect cell performance. Normally closed bleed valves 50 and 52 are provided for this purpose. When an anode bleed is commanded, the bleed valve 50 or 52 is opened and the bled anode exhaust gas is sent to the cathode exhaust gas line 28 depending on which direction the hydrogen gas is currently flowing. Particularly, if the hydrogen gas is being injected into the split stack 12 from the source 40 when a bleed is triggered, then the bleed valve 52 is opened. Likewise, if the hydrogen gas is being injected into the split stack 14 from the source 40 when a bleed is triggered, then the bleed valve 50 is opened. The flow-shifting will typically occur several times during a normal bleed duration so that the bleed valves 50 and 52 have to be opened and closed several times in time with the flow switching.

The fuel cell stacks 12 and 14 generate current. During normal stack operation, the current generated by the stacks 12 and 14 is used to drive system loads, such as an electrical traction system (ETS) 56 on a vehicle. During a shut-down sequence, the current generated by the stacks 12 and 14 may be used to charge a battery 58, or be dissipated by other system components, and then be dissipated by a resistor 68.

At one system shut-down sequence, the compressor 16 is stopped and the valves 20 and 30 are closed to seal the cathode side of the stacks 12 and 14. The flow of hydrogen is continued so that any remaining oxygen in the stacks 12 and 14 is consumed. When the stack power drops to a predetermined level, the current generated by the split 12 stacks and 14 is switched from the ETS 56 to the battery 58. When the stack power decreases to another predetermined level, the stack load is switched to the resistor 68. Particularly, once the voltage has degraded to a fixed cut-off voltage, the stack load is switched to the resistor 68. The cut-off voltage could be the lower limit of a DC/DC converter (not shown), or the lower limit of a power device. The objective of the battery load is to consume and/or store any energy that otherwise would have been wasted. It also reduces the energy consumption requirements of the resistor load.

Once the oxygen has been consumed from the split stacks 12 and 14, the hydrogen flow is turned off and the valves 50, 52, 62 and 66 are closed to seal the anode side of the stacks 12 and 14. When the system 10 is shut-down in this manner, the stacks 12 and 14 include an $N_2/H_2$ mixture in both the cathode side and the anode side. Over time, air will leak into the stacks 12 and 14, and the hydrogen in the stack 12 and 14 will initially consume the oxygen. Additionally, the hydrogen will slowly leak out of the stacks 12 and 14. As a result, the composition of the gases within the stacks 12 and 14 will vary over time between a hydrogen rich mixture in nitrogen and water to an air mixture.

The amount of hydrogen that is used to purge the split stacks 12 and 14 can be calculated based on the volume of the anode side of the stacks 12 and 14, the temperature of the stacks 12 and 14 and the pressure within the split stacks 12 and 14. The hydrogen flow into the stacks 12 and 14 should be roughly one anode volume. If an insufficient amount of hydrogen flows into the stack, some of the fuel cells might be left containing an $H_2/O_2$ front. If too much hydrogen flows into the first stack, excess hydrogen is wasted to the exhaust and might enter into the second stack through compression leading to a stagnant hydrogen/air front causing excessive voltage degradation. The loop volume for each of the stacks 12 and 14 is calculated and this information is combined with the hydrogen flow rate during the start-up to determine the purge time for the first stack.

Figure 2A:
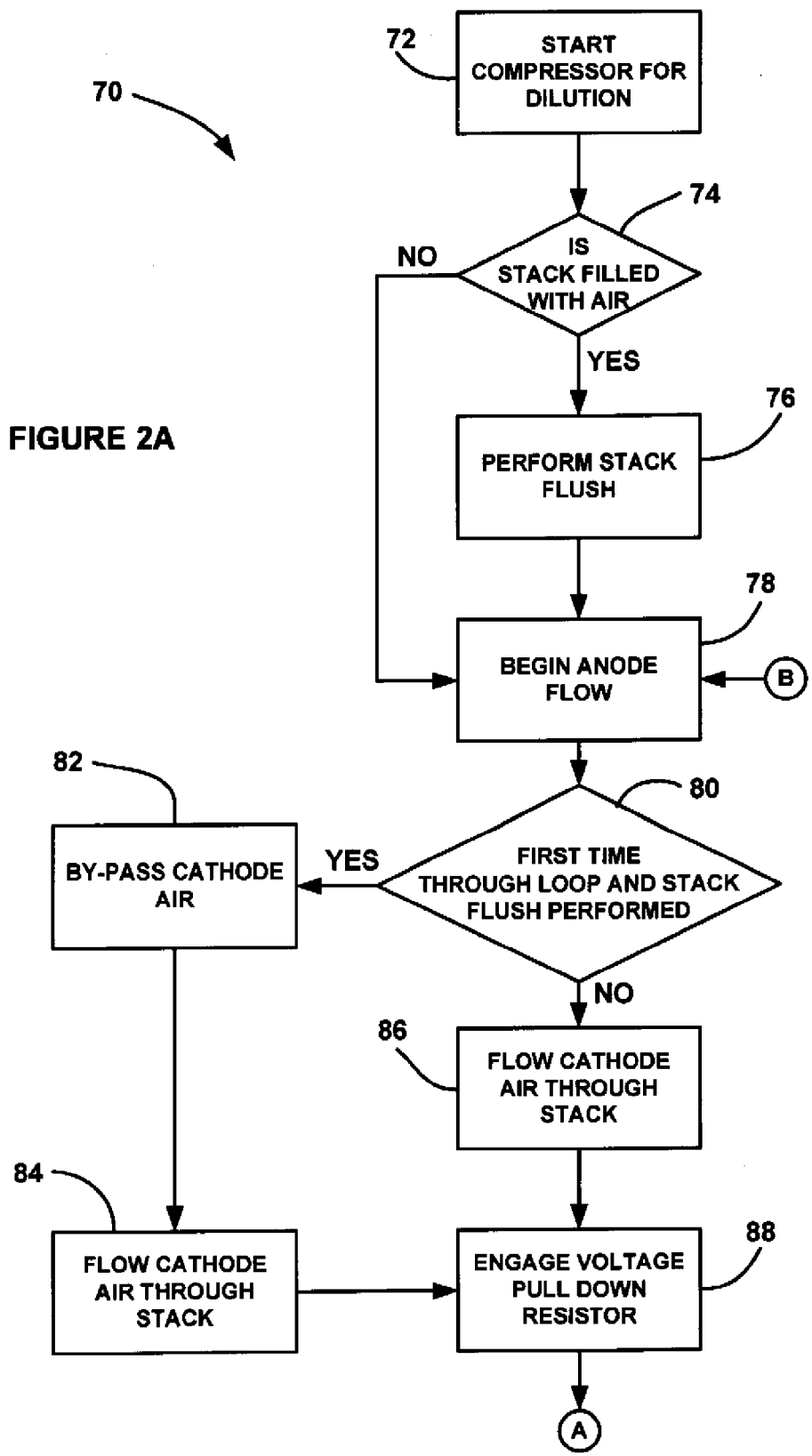
FIGS. 2A and 2B are a flow chart diagram showing a process for providing a fast and reliable fuel cell system start-up, according to an embodiment of the present invention.
Figure 2B:
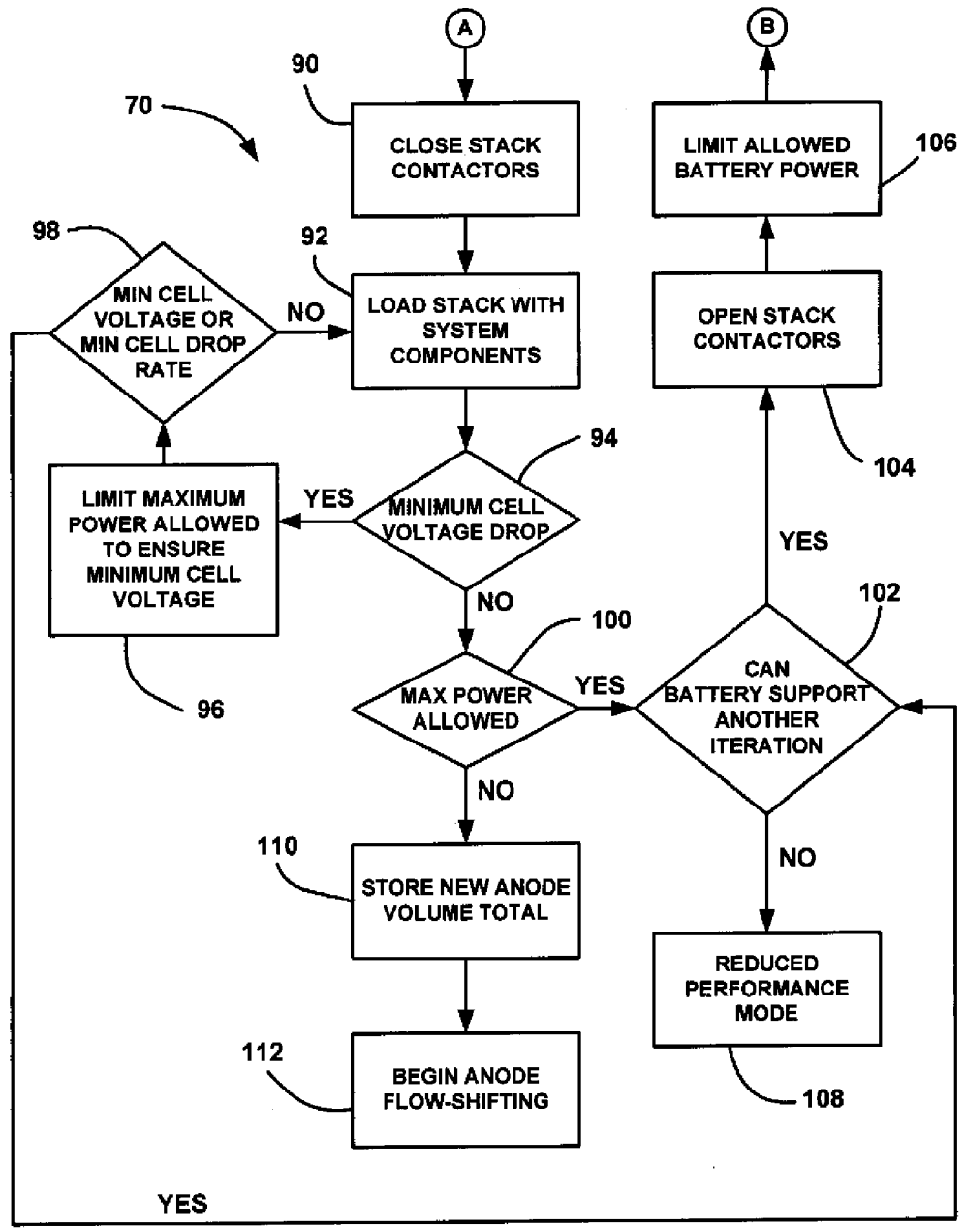

FIGS. 2A and 2B are a flow chart diagram 70 showing a method for quickly and reliably starting the fuel cell system 101 especially during cold starts, according to an embodiment of the present invention. At box 72, the compressor 16 is started for hydrogen output dilution purposes. The initial part of the system start-up includes starting the compressor 16 to provide dilution air for hydrogen that collects in the exhaust as a result of the start-up sequence. The algorithm then determines whether the split stacks 12 and 14 are filled with air at decision diamond 74 as a result of the time they have been shut-down, and if so, initiates a stack flush using a header purge at box 76. This provides a technique for removing air and nitrogen from the header of both of the stacks 12 and 14 prior to the stack flush. After the header has been purged, the stack flush provides a large flow rate of hydrogen gas through the anode flow fields to minimize start-up degradation due to the hydrogen/air front, as discussed above.

The algorithm then begins the anode flow by opening the header valve to the split stacks 12 and 14 in a 50/50 manner to fill the anode flow channels with hydrogen gas at box 78. In this flow process, both of the injectors 38 and 44 are used at the same time to flow hydrogen gas evenly through the split stacks 12 and 14. All large valves are closed at this stage to allow for a well controlled, low flow rate hydrogen injection. The valves that are open typically have a small orifice, or large valves can be used that are pulse width modulated to effectively provide a small valve. The hydrogen injectors 38 and 44 are typically controlled based on the anode outlet pressure of the split stacks 12 and 14. However, in this case, the injectors 38 and 44 will switch modes to flow control where the flow will be metered so that it is as high as possible without causing exhaust emissions to exceed a predetermined hydrogen concentration when mixed with the cathode exhaust. Therefore, the hydrogen flow rate would be varied in real time based on cathode dilution flow.

If the stack is not filled with air at the decision diamond 74, then the algorithm skips the stack flush step at the box 76, and proceeds directly to the step of providing the anode flow at the box 78.

At the same time, there should be a peak anode pressure to cap the injectors 38 and 44. In other words, the cathode exhaust flow rate needs to be known and the anode flow rate will be estimated based on the injector duty cycle. The injectors 38 and 44 should be controlled so as to trigger as high a flow as possible for emissions less than the predetermined threshold, and so that anode pressures do not exceed a predetermined pressure, such as 150 kPa. The duration of this flow is determined based on a look-up table in the software that takes the time since the last shut-down as the input, and outputs a particularly minimum number of anode volumes of hydrogen gas that should be flowed.

The algorithm then determines whether this is the first time through the start loop at decision diamond 80, and whether the anode side flush was skipped at the box 76, meaning that the most recent shut-down time was not too far back in the past where the anode flow channels are still significantly filled with hydrogen gas. If both of these conditions are met, then the algorithm by-passes the cathode air around the stacks 12 and 14 for some duration of the anode flow, such as half, at box 82. When by-passing the cathode air around the split stacks 12 and 14, additional air is not added to the cathode side that may permeate through the membranes to the anode side increasing the potential for the damaging hydrogen/air front. In other words, it is desirable to introduce hydrogen gas into the anode side before air is introduced into the cathode side so that hydrogen permeates through the membrane instead of air, reducing the hydrogen/air front on the anode side of the stacks 12 and 14.

Once the cathode air has by-passed the stacks 12 and 14 for the predetermined anode volume flow, the algorithm then flows the cathode air through the stacks 12 and 14 for the remainder of the anode flow at box 84. If this is not the first time through the control loop or the stack flush did not occur at the box 76, then the algorithm proceeds directly to flowing the cathode air through the stacks 12 and 14 at box 86.

Next, the algorithm continues with the anode flow and engages the pull-down resistor 68 coupled to the split stacks 12 and 14 as a load at box 88 until one of two conditions is met, namely, that the minimum cell voltage is greater than a predetermined voltage value, such as 700 mV, or a predetermined period of time has elapsed, such as 10 seconds. By putting a load on the split stacks 12 and 14, a voltage drop occurs across the stacks 12 and 14 that more nearly matches the high voltage bus line (not shown) coupled to the high voltage battery 58 in the system 10. Particularly, the algorithm uses a stack voltage response to a load to assess if hydrogen and oxygen are being sufficiently distributed to all of the fuel cells by coupling an auxiliary load to the fuel cell stack. This step is one of the ways that the algorithm provides a fast and reliable start-up by making sure that the minimum cell voltage is high enough or enough hydrogen is in the anode flow channels so that the operation of the stacks 12 and 14 is stable. If the stacks 12 and 14 are healthy, and no problems exist, then the algorithm will proceed very quickly through these steps of the control loop. However, if the split stacks 12 and 14 have significantly aged, or degraded for some other reason, then the time period that the algorithm waits during the start-up sequence will provide a better situation for the stacks 12 and 14 to start in a stable manner.

Once the minimum cell voltage is greater than the predetermined voltage value or the predetermined time period has expired, the algorithm then closes the stack contactors to the high voltage bus line at box 90 to allow the split stacks 12 and 14 to operate under the normal loads of the system 10. The algorithm then loads the split stacks 12 and 14 at box 92 with as many of the fuel cell system components as it can up to the maximum limit of the split stacks 12 and 14 for a predetermined period of time, such as seven seconds, to test the split stacks 12 and 14 and see if they will operate normally.

The algorithm then determines whether the minimum cell voltage has dropped to a predetermined voltage, such as 400 mV, at decision diamond 94. If the minimum cell voltage in either of the split stacks 12 or 14 is below the predetermined voltage, then the reliability of the start-up is reduced. The algorithm then proceeds to minimize the maximum power allowed to be drawn from the split stacks 12 and 14 at box 96 in an attempt to try and raise the minimum cell voltage above the predetermined value.

The algorithm also determines whether the minimum cell voltage has dropped below another lower predetermined voltage, such as 200 mV, or the minimum cell voltage drop rate is exceeding a predetermined voltage drop rate, such as 1000 mV/sec, at decision diamond 98. If neither of these two conditions is met, then the algorithm returns to the box 92 to give the split stacks 12 and 14 another attempt to raise their minimum cell voltage above the first predetermined voltage value.

If the minimum cell voltage is not less than the first predetermined voltage value at the decision diamond 94, then the split stack 12 or 14 may be operating properly. The algorithm then determines whether the maximum power allowed from the split stacks 12 and 14 is less than a predetermined value, such as 90 kW, at decision diamond 100. If the maximum stack power is below the predetermined value, then the split stacks 12 and 14 have not raised their maximum power output quick enough during the start-up sequence, meaning that the split stacks 12 and/or 14 may be unstable.

If the minimum cell voltage is less than the second predetermined voltage value or the minimum cell voltage drop rate is greater than the predetermined voltage drop rate at the decision diamond 98, or the split stacks 12 and 14 have not reached the maximum power allowed at the decision diamond 100, then the algorithm determines whether the battery 58 can support another loop through the start-up sequence at decision diamond 102. If there is sufficient battery power and the number of iterations through the loop has been less than a predetermined value, such as eight, then the stack contactors are opened at box 104. Further, the algorithm limits the maximum power draw from the battery 58 to some predetermined maximum value, such as 20 kW, or to the maximum battery power available, whichever is smaller, at box 106. The algorithm then proceeds to the step of providing the anode flow to the split stacks 12 and 14 at the box 78, where the answer to whether this is the first time through the loop at the decision diamond 80 will be no, increasing the number of performed iterations through the loop.

If the battery 58 cannot support another iteration through the loop or the maximum number of iterations through the loop has been reached at the decision diamond 102, then the system 10 is put in a reduced performance mode at box 108 that allows the vehicle to operate, but with limited power, so that it can be driven to a service station or other safe location.

If the maximum power allowed is greater than the predetermined value at the decision diamond 100, then the algorithm modifies the look-up table that identifies how many anode volumes of hydrogen have been flowed into the anode flow field at box 110. If the amount of anode flow needed is higher, then the table is updated permanently in the software for the system. In this way, the start time may be extended in the future for the new times since the last shut-down, but the reliability of the system is improved. Essentially, the table will adapt as the stack ages. Once the table is updated, the algorithm will go to full system operation and begin anode flow-shifting at box 112.

In alternate embodiments, the steps at the box 96 and the decision diamonds 98 and/or 100 can be eliminated, and the no decision from the decision diamond 94 can go to the decision diamond 102. Further, the steps of the decision diamond 102 and the boxes 104 and 106 can also be removed where the no decision of the decision diamond 94 returns to the box 92. Also, the steps below the close contactors at box 90 can be eliminated for a reduced length start-up process.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for starting a fuel cell system, said method comprising:
    starting a compressor for providing cathode air to a fuel cell stack;
    determining whether the fuel cell stack is filled with air and requires an anode flush;
    starting an anode flow to an anode side of the fuel cell stack;
    coupling an auxiliary load to the fuel cell stack until a predetermined minimum cell voltage has been reached by a fuel cell in the stack or a first predetermined period of time has elapsed;
    coupling the fuel cell stack to system loads;
    loading the stack with system components to a predetermined maximum level for a second predetermined period of time; and
    determining whether a minimum cell voltage in the stack is below a first predetermined voltage value.

2. The method according to claim 1 further comprising reducing the maximum power allowed from the stack if the minimum cell voltage is below the first predetermined voltage value, determining whether the minimum cell voltage in the stack is below a second predetermined voltage value or the minimum cell voltage drop rate is greater than a predetermined voltage drop rate.

3. The method according to claim 2 further comprising returning to loading the stack with the system components if the minimum cell voltage is not below the second predetermined voltage value or the minimum cell voltage drop rate is not greater than the predetermined voltage drop rate.

4. The method according to claim 2 further comprising determining whether a maximum stack power allowed is less than a predetermined power value if the minimum cell voltage is greater than the first predetermined voltage value.

5. The method, according to claim 4 further comprising determining whether a battery can support another start-up sequence if the maximum amount of power is less than the predetermined power value, the minimum cell voltage is below the second predetermined voltage value, or the minimum cell voltage drop rate is greater than the predetermined voltage drop rate.

6. The method according to claim 5 further comprising limiting the power drawn from the battery to a predetermined minimum value or a maximum battery power available, whichever is smaller, if the battery can support another start-up sequence.

7. The method according to claim 5 further comprising putting the fuel cell system in a reduced performance mode if the battery cannot support another start-up sequence.

8. The method according to claim 1 further comprising providing an anode side flush using hydrogen gas.

9. The method according to claim 8 further comprising by-passing the cathode air around the stack for approximately one-half of an anode flow volume if the stack has been flushed with hydrogen gas.

10. The method according to claim 1 wherein the fuel cell stack is split fuel cell stacks that employ anode flow-shifting, and wherein beginning an anode flow to the stack includes delivering the same amount of gas flow to both of the split stacks simultaneously.

11. The method according to claim 2 wherein the first predetermined voltage value is about 400 mV, the second predetermined voltage value is about 200 mV and the predetermined cell voltage drop rate is about 1000 mV/sec.

12. The method according to claim 1 wherein the predetermined minimum cell voltage is about 700 mV and the first predetermined period of time is about 10 seconds.

13. The method according to claim 1 wherein the auxiliary load is a resistor.

14. A method for a start-up sequence for a fuel cell system including first and second split stacks, said method comprising:
   starting a compressor for providing cathode input air to the cathode side of the split stacks;
   determining whether the split stacks are filled with air and require an anode flush;
   simultaneously starting an anode flow to the anode side of the first and second split stacks;
   determining whether the start-up sequence is in a first loop and the anode flush has been performed;
   by-passing the split stacks with the cathode air if it is the first time through the start-up sequence loop and the anode flush has been performed for a predetermined number of anode flow volumes;
   flowing the cathode air through the cathode side of the split stacks if it is not the first start-up sequence loop or the anode flush has not been performed;
   coupling an auxiliary load to the split stacks until a predetermined minimum cell voltage has been reached by a fuel cell in the split stacks or a first predetermined period of time has elapsed;
   coupling the split stacks to system loads;
   loading the split stacks with system components to a predetermined maximum level for a second predetermined period of time;
   determining whether a minimum cell voltage in the split stacks is below a first predetermined voltage value;
   determining whether a maximum stack power allowed is less than a predetermined power value if the minimum cell voltage is greater than the first predetermined voltage value; and
   updating a look-up table that identifies how many anode volumes of hydrogen gas have been flowed into the anode of the split stacks if the maximum stack power allowed is greater than the predetermined power value.

15. The method according to claim 14 further comprising reducing the maximum power allowed if the minimum cell voltage is below the first predetermined voltage value, determining whether the minimum cell voltage in the split stacks is below a second predetermined voltage value or the minimum cell voltage drop rate is greater than a predetermined voltage drop rate.

16. The method according to claim 14 further comprising returning to loading the split stacks with the system components if the minimum cell voltage is not below the second predetermined voltage value or the minimum cell voltage drop rate is not greater than the predetermined drop rate.

17. The method according to claim 14 further comprising determining whether a battery can support another start-up sequence if the maximum amount of power is less than the predetermined power value, the minimum cell voltage is below the second predetermined voltage value, or the minimum cell voltage drop rate is greater than the predetermined voltage drop rate.

18. The method according to claim 17 further comprising limiting the power drawn from the battery to a predetermined minimum value or a maximum battery power available, whichever is smaller, if the battery can support another start-up sequence.

19. The method according to claim 17 further comprising putting the fuel cell system in a reduced performance mode if the battery cannot support another start-up sequence.

20. The method according to claim 15 wherein the first predetermined voltage value is about 400 mV, the second predetermined voltage value is about 200 mV and the predetermined cell voltage drop rate is about 1000 mV/sec.

21. The method according to claim 14 wherein the predetermined minimum cell voltage is about 700 mV and the first predetermined period of time is about 10 seconds.

22. The method according to claim 14 wherein the auxiliary load is a resistor.

* * * * *